July 14, 1931.  R. W. OSBORNE  1,814,453
PROTECTIVE DEVICE FOR COMMUNICATION APPARATUS USED WITH
COMMUNICATION LINES SUBJECTED TO EXTRANEOUS VOLTAGE
Filed July 21, 1930
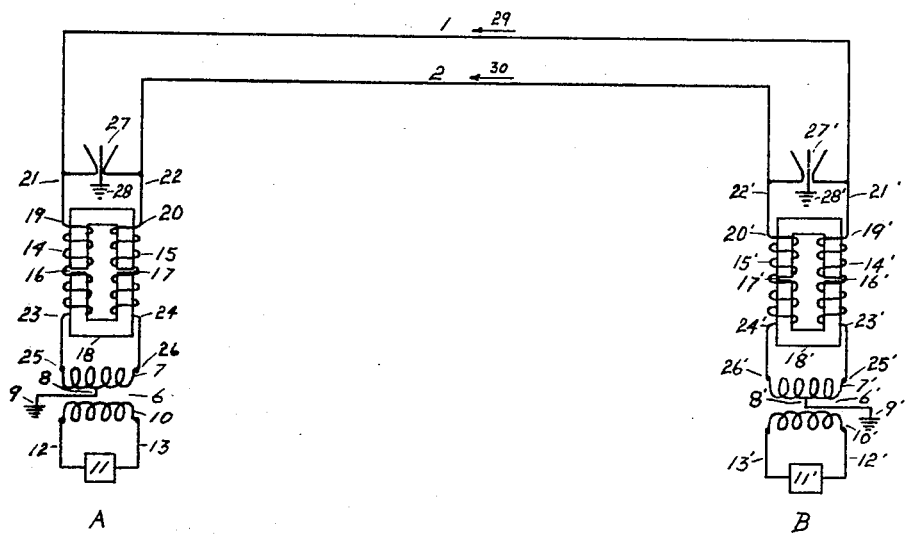

Patented July 14, 1931

1,814,453

UNITED STATES PATENT OFFICE

RALPH WILLOUGHBY OSBORNE, OF TORONTO, ONTARIO, CANADA

PROTECTIVE DEVICE FOR COMMUNICATION APPARATUS USED WITH COMMUNICATION LINES SUBJECTED TO EXTRANEOUS VOLTAGE

Application filed July 21, 1930. Serial No. 469,555.

An alternating current electric power line sets up an alternating magnetic field around its conductors and when a communication line is parallel to such a power line it is influenced by a part of the magnetic field causing a voltage, depending on the intensity of the magnetic field and the proximity of the parallel, to be induced in the communication line conductors. This voltage is induced longitudinally causing a difference of potential between the two extremities of the communication conductors and is commonly called longitudinal induced voltage or longitudinal induction. If connections between the communication conductors and ground are made at two points along the line or at its extremities the circuit thus formed will allow a current to flow along the communication conductors from one ground connection to the other and vice versa in the ground beneath the conductors. The value of the current flowing will be proportional to the longitudinal induced voltage and inversely proportional to the impedance of the circuit.

Heretofore the voltage induced in communication lines paralleling electric power lines has not under normal conditions been difficult to deal with and protective apparatus has been devised which protected the communication instruments, not only under normal conditions, but during transient disturbances which occur under abnormal conditions. With the advent of so called super-power systems with electric power lines carrying enormous power the communication lines paralleling such power lines, have induced in them under normal conditions, voltages of such magnitude that to devise suitable protective apparatus presents a problem of considerable magnitude. Protective devices of existing types have to be so increased in size to protect against the high voltages or currents encountered under normal conditions, that they seriously impair the efficiency of the communication circuit.

Of the existing types of protective apparatus for communication lines paralleling electric power lines, we have the insulating transformer having primary and secondary windings insulated from each other to withstand a high voltage. The primary winding is connected to the communication conductors which are well insulated from ground and the secondary winding is connected to the communication instrument. The large amount of insulation required between the primary and secondary windings of the insulating transformer makes it of such a size and separates the windings so that the efficiency is seriously impaired. We also have the drainage coil comprising a winding wound on a magnetic core and having a neutral point connected to ground and its terminals connected to the two wires of the communication line. At least two drainage coils are connected, usually at the extremities of the line, thus forming a circuit for the flow of induced current to ground. A modification of the drainage coil comprises a transformer having primary and secondary windings, the primary winding having a neutral point connected to ground and its extremities connected to the two wires of the communication line and the secondary winding connected to the communication instrument. Where the normal induced voltage is excessive the drainage windings of the drainage coil or the modification thereof as described, have to be of such proportions to carry the excessive current to ground, that they seriously impair the efficiency of the communication circuit.

The object of my invention is to devise protective apparatus for communication lines subjected to excessive extraneous voltage, which does not seriously impair the efficiency of the communication circuits.

To attain this object I provide means for greatly increasing the longitudinal impedance of the communication line without appreciably increasing the impedance of the communication circuit wherein the communication currents flow. Thus if the extremities of the communication conductors are connected to ground by means of drainage coils, the current which will flow in the circuit thus formed will be proportional to the longitudinal induced voltage and inversely proportional to the longitudinal impedance. If the longitudinal impedance is increased the current will be decreased and with sufficient impedance the current is decreased to such a value that drainage coils or transformers of existing standard types may be used.

In order to understand my invention more fully reference may be had to the following description and accompanying drawing in which is a diagrammatic view of a communication system embodying a form of my invention.

Referring to the drawing it will be noted that I have shown a communication system with communication conductors 1 and 2 paralleling conductors 3, 4 and 5 of a three phase power line. A and B represent the protective and translating devices at the extremities of the communication conductors wherein, with reference to A of the figure, 6 is a transformer having a primary winding 7 with neutral point 8 connected to ground 9 and secondary winding 10 connected to translating device 11 by means of wires 12 and 13. 14 and 15 are two windings wound on a common magnetic core 18. Of windings 14 and 15 extremities 19 and 20 are of like polarity and are connected respectively to conductors 1 and 2 of the communication line by means of wires 21 and 22. Extremities 23 and 24 respectively of windings 14 and 15 are connected respectively to extremities 25 and 26 of primary winding 7 of transformer 6. Arrester 27 is connected to wires 21 and 22 which connect respectively to wires 1 and 2 of the communication line and to ground 28. Gaps 16 and 17 in the magnetic core 18 are for the adjustment of the impedance of the windings 14 and 15.

Due to their proximity to the power wires 3, 4 and 5, a voltage is induced in the wires 1 and 2 of the communication line, the instantaneous direction of which is indicated by the arrows 29 and 30, causing a current to flow in the same direction from ground 9' at B dividing equally at the neutral point 8' of the primary winding 7' of the transformer 6', half flowing each way to the extremities 25' and 26' of the primary winding 7' thence to the extremities 23' and 24' of windings 14' and 15', through windings 14' and 15' respectively to their extremities 19' and 20' respectively, through wires 21' and 22', line wires 1 and 2 of the communication line, traversing the circuits at A in the reverse order to ground 9 and through ground to ground 9' at B. Windings 14 and 15 at A and windings 14' and 15' at B being respectively in series with wires 1 and 2 of the communication line, are adapted to greatly increase the longitudinal impedance of the line between ground 9 at A and ground 9' at B.

To explain further in detail I will refer to A only, as B is similar in every respect. Windings 14 and 15 and their associated magnetic core 18 are so proportioned that the windings 14 and 15 are capable of maintaining predetermined maximum voltages between the communication line wires 1 and 2 and ground 9 and further, each winding 14 and 15 maintains equal voltages on wires 1 and 2 respectively. It is desirable to allow as much current to flow from line wires 1 and 2 to ground 9 as the primary winding 7 of the transformer 6 will carry. Now the current through windings 14 and 15 may be regulated without changing the maximum voltage that the windings are adapted to maintain and this is accomplished by adjusting gaps 16 and 17 in the magnetic core 18. Increasing the gaps decreases the impedance of the windings 14 and 15 allowing more current to flow. The arrester 27 is adjusted to discharge excess current to ground 28 when the voltage on the line wires 1 and 2 exceeds the predetermined maximum voltage that windings 14 and 15 are adapted to maintain thus protecting them from being damaged by excess voltage and current.

From the foregoing it is seen that windings 14 and 15 offer equal impedances to currents flowing through them from wires 1 and 2 as indicated by the arrows 29 and 30 respectively in the same direction to ground 9 and the longitudinal impedance is thus increased, but because windings 14 and 15 are wound on the same magnetic core 18 and their extremities 19 and 20 respectively are of like polarity, the current used for communication flowing out through winding 14 and returning through winding 15 is not opposed appreciably by windings 14 and 15 and therefore the circuit as used for the transmission of communication current has its impedance increased to a negligible degree due to the presence of windings 14 and 15.

It will be seen further that considering the voltage of ground 9 as being zero, the voltage on line wires 1 and 2 grades down through windings 14 and 15 to zero at ground 9 and the primary windings 7 of the transformer 6 is located nearest the zero point of the gradient, its neutral point 8 being connected to the ground 9. Further protection to the translating device 11 which is connected to the secondary winding 10 of the transformer 6 is given because the secondary winding 10 is insulated from the primary winding 7. It appears therefore that if the connection from the neutral point 8 of the primary winding 7 of transformer 6 is made securely to ground 9, the translating device 11 is well protected from voltage on the line wires 1 and 2 of the communication line.

While I have shown and described one embodiment of my invention, it will be understood that various modifications may be made without departing from the spirit and scope of the appended claims.

I claim:

1. In a protective device for communication apparatus used with communication lines subjected to extraneous voltage, the combination with a communication line, of means comprising a pair of windings each in inductive relation to the other and wound around a common magnetic core and connected respectively in the same relative polarity in serious relation with the two wires of the communication line and means comprising gaps in the said magnetic core for adjusting the impedance of the said pair of windings.

2. A protective device for communication apparatus used with communication lines subjected to extraneous voltage comprising a pair of communication wires, a winding having a neutral point connected to ground, a pair of windings each in inductive relation to the other and wound around a common magnetic core and having their respective extremities of like polarity connected respectively to the extremities of the said winding having a neutral point and their opposite extremities connected respectively to the two wires of the communication line, means for adjusting the impedance of the said pair of windings and an arrester connected across the two wires of the communication line and adapted to discharge current to ground when the voltage becomes excessive.

3. A protective device for communication apparatus used with communication lines subjected to extraneous voltage comprising a pair of communication wires, a winding having a neutral point connected to ground, a pair of windings each in inductive relation to the other and wound around a common magnetic core and having their respective extremities of like polarity connected respectively to the extremities of the said winding having a neutral point and their opposite extremities connected respectively to the two wires of the communication line, means comprising gaps in the said common magnetic core for adjusting the impedance of the said pair of windings and an arrester connected across the two wires of the communication line and adapted to discharge current to ground when the voltage becomes excessive.

4. A protective device for communication apparatus used with communication lines subjected to extraneous voltage comprising a pair of communication wires, a winding having a neutral point connected to ground, a pair of windings each in inductive relation to the other and wound around a common magnetic core and having their respective extremities of like polarity connected respectively to the extremities of the said winding having a neutral point and their opposite extremities connected respectively to the two wires of the communication line, means comprising gaps in the said common magnet core for adjusting the impedance of the said pair of windings, said pair of windings being adapted to maintain a range of voltage between the said two wires of the communication line and ground and an arrester connected across the two wires of the communication line and adapted to discharge current to ground when the upper limit of the aforementioned range of voltage is exceeded.

5. In a protective device for communication apparatus used with communication lines subjected to extraneous voltage, the combination with a communication line of a plurality of devices for the protection of their respective translating devices, each comprising a transformer with a primary winding having a neutral point connected to ground and a secondary winding connected to a translating device, a pair of windings each in inductive relation to the other and wound around a common magnetic core and having their respective extremities of like polarity connected respectively to the extremities of the said primary winding having a neutral point connected to ground and their opposite extremities connected respectively to the two wires of the communication line, means comprising gaps in the said common magnetic core for adjusting the impedance of the said pair of windings, said pair of windings being adapted to maintain a range of voltage between the said two wires of the communication line and ground and an arrester connected across the two wires of the communication line and adapted to discharge current to ground when the upper limit of the aforementioned range of voltage is exceeded.

In testimony whereof I affix my signature this sixteenth day of July at the city of Toronto.

RALPH WILLOUGHBY OSBORNE.